United States Patent
Minami

(10) Patent No.: US 8,714,616 B2
(45) Date of Patent: May 6, 2014

(54) PROTECTING FRAME STRUCTURE FOR POWER SUPPLY APPARATUS

(75) Inventor: Hiromasa Minami, Shizuoka-ken (JP)

(73) Assignee: Suzuki Motor Corporation, Hammatsu-shi, Shizuoka-ken (JP)

( * ) Notice: Subject to any disclaimer, the term of this patent is extended or adjusted under 35 U.S.C. 154(b) by 0 days.

(21) Appl. No.: 13/638,322

(22) PCT Filed: Apr. 11, 2011

(86) PCT No.: PCT/JP2011/058968
§ 371 (c)(1),
(2), (4) Date: Sep. 28, 2012

(87) PCT Pub. No.: WO2011/145408
PCT Pub. Date: Nov. 24, 2011

(65) Prior Publication Data
US 2013/0015683 A1    Jan. 17, 2013

(30) Foreign Application Priority Data
May 19, 2010   (JP) .................................. 2010-114983

(51) Int. Cl.
*B60N 3/12* (2006.01)

(52) U.S. Cl.
USPC ...................................................... 296/37.16

(58) Field of Classification Search
USPC .......... 296/37.16, 10, 37.1; 280/204.3, 288.4, 280/748; 297/216.1, 216.14
See application file for complete search history.

(56) References Cited

U.S. PATENT DOCUMENTS

| 4,266,704 A | * | 5/1981 | Swanson | 224/543 |
| 4,326,726 A | * | 4/1982 | Dunchock | 280/79.3 |

(Continued)

FOREIGN PATENT DOCUMENTS

| JP | 2004-042828 A | 2/2004 |
| JP | 2004-148849 A | 5/2004 |

(Continued)

OTHER PUBLICATIONS

International Search Report for Application No. PCT/JP2011/058968 dated Jul. 12, 2011.

*Primary Examiner* — Kiran B Patel
(74) *Attorney, Agent, or Firm* — Alston & Bird LLP

(57) ABSTRACT

The present invention is intended to reduce impact of external forces on a power supply apparatus by placing the power supply apparatus close to a peripheral component inside a vehicle and as far away as possible from ends of the vehicle, which are susceptible to the impact of the external forces from outside the vehicle. The present invention provides a protecting frame structure for a power supply apparatus, including a power supply apparatus, a protecting frame structure, a floor panel adapted to fasten a lower end portion of the protecting frame structure, a peripheral component which includes a tilting structure adapted to tilt to a side on which the protecting frame structure is installed, wherein the protecting frame structure includes first and second frames extending in a vertical direction of the vehicle and a third frame extending in a width direction of the vehicle, the first and second frame have respective bending portions and inclined portions and are coupled at respective upper ends to the third frame, the inclined portions being located on an upper side of the vehicle above the bending portions and being inclined toward a rear side of the vehicle, and the third frame has coupling portions which couple to the first and second frames and is connected at both ends to lateral surfaces of the vehicle.

4 Claims, 4 Drawing Sheets

(56) References Cited

U.S. PATENT DOCUMENTS

| | | | |
|---|---|---|---|
| 4,867,465 A * | 9/1989 | Dunchock | 280/79.3 |
| 5,725,037 A * | 3/1998 | Faulhaber | 144/285 |
| 5,810,186 A * | 9/1998 | Lam | 220/1.5 |
| 5,829,655 A * | 11/1998 | Salopek | 224/402 |
| 5,951,084 A * | 9/1999 | Okazaki et al. | 296/37.16 |
| 6,105,839 A * | 8/2000 | Bell | 224/275 |
| 6,386,412 B1 * | 5/2002 | Konechne | 224/543 |
| 6,623,059 B2 * | 9/2003 | Gehring et al. | 296/37.5 |
| 6,623,060 B2 * | 9/2003 | Gehring et al. | 296/37.5 |
| 6,644,710 B2 * | 11/2003 | Seel et al. | 296/37.5 |
| 6,672,640 B2 * | 1/2004 | Gehring et al. | 296/37.5 |
| 6,676,184 B2 * | 1/2004 | Gehring et al. | 296/37.5 |
| 7,004,274 B2 * | 2/2006 | Shibasawa et al. | 180/68.5 |
| 7,059,646 B1 * | 6/2006 | DeLong et al. | 296/24.43 |
| D549,154 S * | 8/2007 | Panasewicz et al. | D12/424 |
| 7,350,681 B2 * | 4/2008 | Polburn et al. | 224/275 |
| 7,609,946 B2 * | 10/2009 | Schedivy | 386/200 |
| 7,641,253 B2 * | 1/2010 | Steiger et al. | 296/24.4 |
| 7,665,642 B2 * | 2/2010 | Abbate | 224/585 |
| 7,665,790 B2 * | 2/2010 | Oino | 296/37.16 |
| 7,758,092 B2 * | 7/2010 | Kolpasky et al. | 296/37.5 |
| 7,959,390 B2 * | 6/2011 | Gorski | 410/121 |
| 7,980,628 B2 * | 7/2011 | Hu et al. | 297/188.1 |
| 8,251,424 B2 * | 8/2012 | Parfut et al. | 296/24.43 |
| 8,322,772 B1 * | 12/2012 | Gilbeck et al. | 296/37.15 |
| 8,408,638 B2 * | 4/2013 | Pencak et al. | 296/191 |
| 8,414,046 B2 * | 4/2013 | Pencak et al. | 296/24.3 |
| 2003/0178869 A1 * | 9/2003 | Adams | 296/39.1 |
| 2003/0222475 A1 * | 12/2003 | Nakamitsu et al. | 296/37.16 |
| 2004/0079569 A1 | 4/2004 | Awakawa | |
| 2005/0225108 A1 * | 10/2005 | Panasewicz et al. | 296/24.44 |
| 2007/0069542 A1 * | 3/2007 | Steiger et al. | 296/24.44 |
| 2010/0289295 A1 | 11/2010 | Yoda et al. | |
| 2013/0049688 A1 * | 2/2013 | Minami | 320/109 |

FOREIGN PATENT DOCUMENTS

| | | |
|---|---|---|
| JP | 2004-148852 A | 5/2004 |
| JP | 2005-112284 A | 4/2005 |
| JP | 2009-274665 A | 11/2009 |
| WO | WO 2009/139229 A1 | 11/2009 |

* cited by examiner

PROTECTING FRAME STRUCTURE FOR POWER SUPPLY APPARATUS

TECHNICAL FIELD

The present invention relates to a protecting frame structure for a power supply apparatus, and more particularly, relates to a protecting frame structure for a power supply apparatus that is configured by multiple frames and is mounted on a vehicle while being placed close to a peripheral component.

BACKGROUND ART

Regarding a vehicle, such as an electric car, and a hybrid car which runs on a motor, a power supply apparatus serving as a drive source for the motor is mounted at a luggage compartment while the power supply apparatus is housed in a protecting frame structure, and a sufficient crushable zone against external forces (rear impact) which acts from behind is secured. In the future, if a power supply apparatus is mounted in a narrow luggage compartment space of a smaller vehicle such as a hatchback car, there may be cases in which a sufficient crushable zone against a rear impact cannot be secured.

Regarding a conventional protecting frame structure for a power supply apparatus, a technique in which a power supply apparatus (secondary batteries) is housed in a protecting frame structure (frame unit) configured by multiple frames and external forces acting on the power supply apparatus can be reduced, has been proposed. (PTL 1).

CITATION LIST

Patent Literature

PTL 1: Japanese Patent Publication No. 2009-274665

SUMMARY OF INVENTION

Technical Problem

For example, when a power supply apparatus is mounted on the vehicle while extending in a height direction of a vehicle due to increase in the capacity of secondary batteries of the power supply apparatus, the technique proposed in PTL 1 has the following problems.

(1) When a vertical frame of the protecting frame structure is extended in a vertical direction and then the protecting frame structure is mounted in the luggage compartment of the vehicle, for the purpose of reducing impact of external forces (rear-end collision by another vehicle (rear impact)) from outside the vehicle on the power supply apparatus, it is desirable that the protecting frame structure be placed close to a rear seat that corresponds to a peripheral component located in forward part of the luggage compartment in the vehicle.

However, as shown in FIG. 4, generally, a rear seat 103 placed on a floor panel 102 of a vehicle 101 has a tilting structure. Therefore, a rear seatback 104 tilts, on an upper-end side, toward the luggage compartment of the vehicle. As a result, there is a problem in that if a rectangular protecting frame structure 107 which houses a power supply apparatus 106 is mounted on the floor panel 102 in the luggage compartment 105 behind the rear seatback 104, a large space is generated between the rear seatback 104 and the protecting frame structure 107. Furthermore, there is a problem in that the mounting position of the protecting frame structure 107 in the luggage compartment 105 becomes closer to the rear end of the vehicle, and whereby susceptibility to impact of external forces is increased, for example, when the vehicle is hit from behind by another vehicle.

(2) The protecting frame structure is mounted only in its lower end portion to the floor panel so that the center-of-gravity position of the protecting frame structure is raised. Therefore, there is a problem in that if the lower end portion of the protecting frame structure is simply mounted on the floor panel by mounting members such as bolts, the protecting frame structure will lack stability in the height direction of the vehicle, and the torsion of the upper side of the protecting frame structure will be likely to occur during running of the vehicle. If rigidity of the protecting frame structure itself is increased or the lower end portion of the protecting frame structure is mounted firmly, the above problem can be avoided, but this will increase the weight of the protecting frame structure and vehicle.

(3) It is permitted that movement of the protecting frame structure is caused by external forces from outside the vehicle. Consequently, when the protecting frame structure is pushed by an adjacent car body part (e.g., back door) which deforms simultaneously, the protecting frame structure may fall toward the forward side of the vehicle.

An object of the present invention is to provide a protecting frame structure for a power supply apparatus, wherein even when a power supply apparatus extending in a height direction of a vehicle is mounted on the vehicle, the protecting frame structure can reduce impact of external forces on the power supply apparatus by placing the power supply apparatus close to a peripheral component inside the vehicle and as far away as possible from ends of the vehicle which are susceptible to the impact of the external forces from outside the vehicle.

Solution to Problem

The present invention provides a protecting frame structure for a power supply apparatus, the power supply apparatus mounted on a vehicle, and the protecting frame structure configured by a plurality of interconnected frames and configured to house the power supply apparatus therein, the protecting frame structure comprising: a floor panel configured such that a lower end portion of the protecting frame structure is mounted; and a peripheral component including a tilting structure installed by extending in a vertical direction of the vehicle, the tilting structure tilting toward a position on which the protecting frame structure is installed, wherein the protecting frame structure includes a first frame and a second frame which extend in the vertical direction of the vehicle, and a third frame which extends in a width direction of the vehicle, the first frame and the second frame have bending portions and inclined portions, upper ends of the first frame and the second frame are respectively coupled to the third frame, the inclined portions are located adjacent to an upper portion of the vehicle above the bending portions and configured to be inclined rearward on the vehicle, the third frame has coupling portions which couple to the first frame and the second frame, and both ends of the third frame are respectively connected to lateral surfaces (flanks) of the vehicle.

Advantageous Effects of Invention

The protecting frame structure for the power supply apparatus according to the present invention can be installed close to the peripheral component without providing a more than necessary space between the protecting frame structure and the peripheral component adjacent to the protecting frame structure. Consequently, the protecting frame structure can be installed in the vehicle while its mounting position is away from the rear end of the vehicle, and external forces exerted on the power supply apparatus in case when, for example, the vehicle is hit from behind by another vehicle, can be reduced.

The protecting frame structure for the power supply apparatus according to the present invention is not only fixed in its lower end portion to the floor panel, but also is connected to the lateral surfaces of the vehicle. Therefore, the protecting frame structure can be fixed to the car body more securely, an upper end portion of the protecting frame structure can be fixed to the lateral surfaces of the vehicle, and this prevents the upper end portion of the protecting frame structure from undergoing torsion and prevents the protecting frame structure from falling down.

Furthermore, in the protecting frame structure for a power supply apparatus according to the present invention, the external forces received by the protecting frame structure can be transmitted to the car body via the third frame, and increases in the weight of the vehicle is inhibited while eliminating the need to firmly fix the lower end portion of the protecting frame structure to the floor panel.

DESCRIPTION OF EMBODIMENTS

The protecting frame structure for a power supply apparatus according to the present invention can be installed without providing a more than necessary space between the protecting frame structure and a peripheral component, and it can make impact of external forces on the power supply apparatus be reduced.

An embodiment of the present invention will be described below with reference to the drawings.

Embodiment

Figure 2:
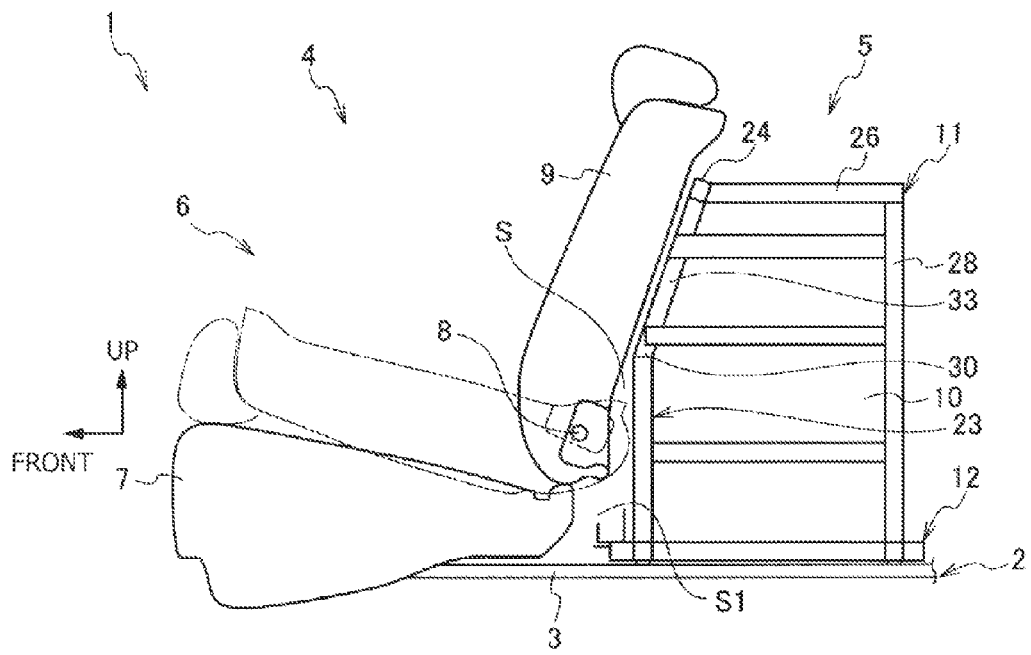
FIG. 2 is a side view showing a condition in which the protecting frame structure is mounted in a luggage compartment. (Embodiment)

In FIG. 2, the reference numeral "1" denotes a vehicle, the reference numeral "2" denotes a car body, the reference numeral "3" denotes a floor panel, the reference numeral "4" denotes a cabin, and the reference numeral "5" denotes a luggage compartment. The vehicle 1 has a rear seat 6 which is placed on the floor panel 3 in the cabin 4. A base 12 for a protecting frame structure 11 described later is mounted on the floor panel 3. Multiple structural members are mounted on the floor panel 2 to ensure rigidity of the car body itself, and they maintain predetermined rigidity.

The rear seat 6 includes a rear seat cushion 7 which is mounted on the floor panel 2, and a rear seatback 9 which is installed at the rear end of the rear seat cushion 7 in such a way as to be able to be folded forward centering around a rotation axis 8 and be tilted backward to a standing position by extending in a vertical direction of the vehicle. The rear seat 6 is a peripheral component close to which the protecting frame structure 11 is installed. The rear seat 6 is located in front of the protecting frame structure 11 in the vehicle and is equipped with the rear seatback 9 configured to tilt toward the protecting frame structure 11. Inclined portions 33 and 34 of a first frame 22 and second frame 23 described later, run parallel to the rear seatback 9 which is a component of the rear seat 6, and the inclined portions 33 and 34 tilt toward the rear side of the vehicle. Incidentally, the peripheral component is not limited to the rear seat 6, and may be another component which tilts further toward the protecting frame structure 11 as the component goes upward in the vehicle 1.

Next to the rear seatback 9, a power supply apparatus 10 is mounted on the floor panel 3 of the luggage compartment 5 behind the rear seat 6, and the floor panel 3 is part of the car body 2. The power supply apparatus 10 which is housed in the protecting frame structure 11 is configured by secondary batteries which generate high voltage. The protecting frame structure 11 has its lower end portion fastened to the floor panel 3. Incidentally, not only the power supply apparatus 10, but also auxiliary equipment (not shown) thereof are held by the protecting frame structure 11 while being stacked in the height direction of the vehicle, and are mounted in the luggage compartment 4 of the vehicle 1. The rear seatback 9 of the above-described rear seat 6 is a peripheral component which includes a tilting structure installed by extending in the vertical direction of the vehicle and adapted to tilt toward the side (rear side) on which the protecting frame structure 11 is installed.

The protecting frame structure 11 for the power supply apparatus 10 contains the power supply apparatus 10 and auxiliary equipment thereof stacked in the height direction of the vehicle and mounted together in the luggage compartment 4 of the vehicle 1. The power supply apparatus 10 and auxiliary equipment thereof are held in the protecting frame structure 11 configured by multiple frames. The protecting frame structure 11 is configured by multiple frames of hollow metal tubing, and the frames are coupled to one another while fastening members such as bolts or by welding. Incidentally, the protecting frame structure 11 according to the present embodiment is structured to be symmetrical with respect to the center of the vehicle in a width direction.

Figure 1:
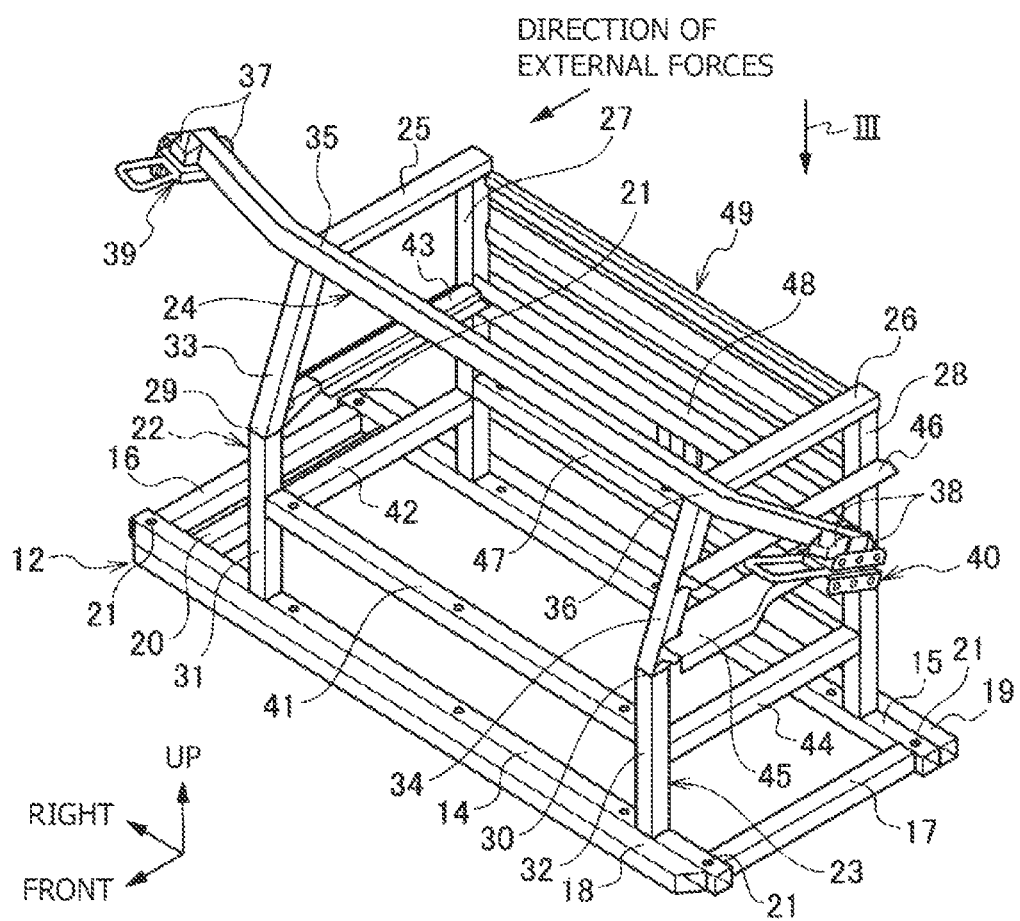
FIG. 1 is a perspective view of a protecting frame structure. (Embodiment)

As shown in FIG. 1, in its lower end portion, the above-described protecting frame structure 11 has the base 12 to be fastened to the floor panel 3 of the luggage compartment 4. The base 12 has a shape of a rectangular frame formed by two transverse frames 14 and 15 and longitudinal frames 16 and 17. The transverse frames 14 and 15 extend parallel to the width direction of the vehicle while being spaced away from each other in a front and rear direction. The longitudinal frames 16 and 17 are each coupled to one of opposite ends of the two transverse frames 14 and 15 while extending in the front and rear direction of the vehicle. Respective reinforcement frames 18 and 19 are coupled to the front side and rear side of the two transverse frames 14 and 15 by extending in the width direction of the vehicle. A reinforcement frame 20 is coupled near the right longitudinal frame 14 between the two transverse frames 14 and 15 while extending in the front and rear direction of the vehicle. A fixing hole 21 is provided in each of the opposite ends of the transverse frames 14 and 15. The protecting frame structure 11 has its base 12 fastened to the floor panel 3 with fastening members such as bolts passed through the fixing holes 21 of the transverse frames 14 and 15.

The protecting frame structure 11 described above includes the first frame 22, the second frame 23, a third frame 24, a fourth frame 25, a fifth frame 26, and a seventh frame 27.

The first frame 22 and second frame 23 are installed by extending in the vertical direction of the vehicle. The third frame 24 is installed by being coupled to upper ends of the first frame 22 and the second frame 23 and extending in a width direction of the vehicle. The fourth frame 25 and the fifth frame 26 are installed so as to extend along the floor panel 3 toward rear part of the vehicle by being coupled to those portions of the third frame 24 which are coupled to the first frame 22 and the second frame 23. The sixth frame 27 and the seventh frame 28 are coupled to the rear ends of the above-described fourth frame 25 and fifth frame 26, respectively, while extending in the vertical direction of the vehicle.

The above-described first frame 22 and second frame 23 have their lower ends coupled near those opposite ends of the frame 14 on the front side of the base 12 which are located in the width direction of the vehicle. The first frame 22 and the second frame 23 include respective bending portions 29 and 30 located at intermediate positions. The first frame 22 and the second frame 23 include vertical portions 31 and 32 located on the lower side of the vehicle below the bending portions 29 and 30 while extending vertically along the vehicle. The first frame 22 and the second frame 23 include the inclined portions 33 and 34 which are located on the upper side of the vehicle above the bending portions 29 and 30 and are configured to be inclined toward the rear side of the vehicle while the respective upper ends of the inclined portions 33 and 34 are coupled to the above-described third frame 24. As shown in FIG. 2, the above-described bending portions 29 and 30 are provided between upper end and lower end of the rear seatback 9 of the above-described rear seat 6, which is a peripheral component, at about the same level in the vertical direction of the vehicle as the top surface of the power supply apparatus 10 configured by secondary batteries stacked in the vertical direction.

The vertical portions 31 and 32 located below the bending portions 29 and 30 are so related to the rear seatback 9 as to depart downward from it by beginning at the bending portions 29 and 30. On the other hand, the inclined portions 33 and 34 located above the bending portions 29 and 30 are inclined substantially in parallel to the rear seatback 9, and are inclined further rearward as they go to upper end portions.

One of the reasons why the inclined portions 33 and 34 are inclined, is to provide the rear seatback 9 with such a structure as to be inclined rearward and upward in the vehicle while placing the protecting frame structure 11 at the closest possible location behind the rear seatback 9. Another reason is that the inclined portions 33 and 34 connected to the third frame 24 which transmits external forces to the car body 2, can transmit the forces more efficiently and can prevent local deformation and destruction of the protecting frame structure 11 if structured to bend and extend in a direction opposite the external forces. Incidentally, the inclined portions 33 and 34 may be structured to depart upward from the rear seatback 9 by beginning at the bending portions 29 and 30.

Furthermore, in the first frame 22 and second frame 23, the vertical portions 31 and 32, and respective inclined portions 33 and 34 may be configured by being welded together or by being fastened together with fastening members such as bolts. The first frame 22 and the second frame 23 may be configured by bending single tubes. The vertical portions 31 and 32 do not always need to be configured to extend in the vertical direction. The vertical portions 31 and 32 may be inclined toward rear part of the vehicle along with the power supply apparatus 10 which is housed in the protecting frame structure 11, as in the case of the inclined portions 33 and 34. However, the vertical portions 31 and 32 and respective inclined portions 33 and 34 are configured not to form straight lines, and that is to say, the first frame 22 and second frame 23 are configured to have the bending portions 29 and 30.

The third frame 24 described above includes coupling portions 35 and 36 which couple to the first frame 22 and the second frame 23, and the coupling portions 35 and 36 are coupled to the rearward-inclined upper ends of the first frame 22 and the second frame 23 such that the opposite ends in the car width direction will reach an inner structure (side body) on lateral surfaces of the vehicle. The third frame 24 is bent at the coupling portions 35 and 36 in which the third frame 24 is coupled to the first frame 22 and the second frame 23, and both side portions of the third frame 24 in the width direction of the vehicle extend toward rear part of the vehicle.

Consequently, both sides, in the width direction of the vehicle, of the third frame 24 have the following structure. The structure bends and extends in a direction opposite a predetermined direction of external forces which might be exerted on the vehicle 1, namely, in a direction (specifically, toward rear part of the vehicle) opposite the direction of external forces which might be exerted on the rear part of the vehicle in case, for example, the vehicle is hit by another car. Both ends, in the width direction of the vehicle, of the third frame 24 have respective mounting portions 37 and 38. The mounting portions 37 and 38 at both ends of the third frame 24 are attached to a so-called side body, i.e., the inner structure on the lateral surfaces of the vehicle, with fastening members such as bolts.

Preferably the third frame 24 coupled to the side body is placed in a forward end portion and upper end portion of the protecting frame structure 11. The reasons for this are: that the forward side of the vehicle as far away as possible from the rear end of the vehicle is more preferable than the rear end where the vehicle 1 is highly likely to be deformed by external forces exerted, for example, when the vehicle is hit from behind by another vehicle; that the forward side of the vehicle is highly efficient in preventing the upper side of the protecting frame structure 11 from undergoing torsion and in preventing the protecting frame structure from falling due to external forces; and that neighboring frames 22 and 23 connected to the third frame 24 adapted to transmit external forces to the car body 2 become more efficient in transmitting the external forces exerted on the protecting frame structure 11 to the car body if structured to bend in the direction (specifically, toward rear part of the vehicle) opposite the direction of action of the external forces. This reduces the probability of causing local deformation and destruction of the frames and car body 2.

The inner structure on the lateral surfaces of the car body on which the mounting portions 37 and 38 of the third frame 24 are mounted corresponds to strikers 39 and 40 adapted to fasten the rear seatback 9. The strikers 39 and 40 are mounted on the inner structure on the lateral surfaces of the car body extending in the front and rear direction and vertical direction of the vehicle 1, i.e., on the so-called side body, and the mounting portions 37 and 38 of the third frame 24 at both ends in the width direction of the vehicle are coupled to the strikers 39 and 40 using fastening members such as bolts.

Predetermined rigidity is secured for mounting locations of the strikers 39 and 40 and surroundings thereof by other structural body components (not shown). Incidentally, the components on which the mounting portions 27 and 28 of the third frame 24 are mounted, are not limited to the strikers 39 and 40 described in the present embodiment, and may be other structural components on the side body, provided similar rigidity is secured.

The above-described fourth frame 25 and fifth frame 26 are coupled at respective forward ends to the coupling portions 35 and 36 between the third frame 24 and the first and second frames 22 and 23, and the fourth and fifth frames 25 and 26 extend along the floor panel 2 toward rear part of the vehicle. Rear ends of the fourth frame 25 and the fifth frame 26 are coupled to upper ends of the above-described sixth frame 27 and seventh frame 28, respectively. Incidentally, the fourth frame 25 and the fifth frame 26 are structured to extend in a predetermined direction of external forces exerted on the vehicle 1 and the protecting frame structure 11.

In order to pair up with the first frame 22 and second frame 23, respectively, the above-described sixth frame 27 and seventh frame 28 have their respective lower ends coupled near respective opposite ends of the frame 15 behind the base 12 in the width direction of the vehicle. The sixth frame 27 and the seventh frame 28 have their respective upper ends coupled to rear ends of the fourth frame 25 and the fifth frame 26, respectively, the upper ends extending upward in the vehicle. Incidentally, the sixth frame 27 and the seventh frame 28 may be configured to have bending portions in the middle as in the case of the first frame 22 and the second frame 23.

The front first frame 22 and the second frame 23 on the front side have the vertical portions 31 and 32 below the bending portions 29 and 30 coupled together while a reinforcement frame 41 extends in the width direction of the vehicle. The vertical portion 31 of the above-described first frame 22 and the sixth frame 27 placed one behind the other in the front and rear direction of the vehicle are coupled together by a reinforcement frame 42 extending in the front and rear direction of the vehicle. The inclined portion 33 of the above-described first frame 22 and the sixth frame 27 placed one behind the other in the front and rear direction of the vehicle are coupled together by a reinforcement frame 43 extending in the front and rear direction of the vehicle. The vertical portion 32 of the above-described second frame 23 and the seventh frame 28 placed one behind the other in the front and rear direction of the vehicle are coupled together by a reinforcement frame 44 extending in the front and rear direction of the vehicle. The inclined portion 34 of the above-described second frame 23 and the seventh frame 28 placed one behind the other in the front and rear direction of the vehicle are coupled together by two reinforcement frames 45 and 46 extending in the front and rear direction of the vehicle. The above-described sixth frame 27 and seventh frame 28 on the rear side are coupled together at an intermediate position and on a lower side by two reinforcement frames 47 and 48 extending in the width direction of the vehicle, and on an upper rear side by a flat-plate partition wall 49 extending in the width direction of the vehicle.

In the protecting frame structure 11, the power supply apparatus 10 is housed in a space surrounded by the transverse frames 14 and 15 of the base 12, the first frame 22, the second frame 23, the third frame 24, the fourth frame 25, the fifth frame 26, the sixth frame 27, and the seventh frame 28, the reinforcement frames 41 to 48, and the partition wall 49 while the base 12 in the lower end portion is fastened to the floor panel 6.

As shown in FIG. 1 and FIG. 2, in the protecting frame structure 11 for the power supply apparatus 10, the first frame 22 and the second frame 23 make up the protecting frame structure 11 while extending in the vertical direction while being located closest to the rear seatback 9 which is an adjacent peripheral component, and these first frame 22 and second frame 23 have the bending portions 29 and 30 in the middle as well as the inclined portions 33 and 34 inclined along the rear seatback 9 which is the peripheral component.

The first frame 22 and second frame 23 having the bending portions 29 and 30 are placed out of a range of movement of the rear seatback 9 which is a peripheral component and structured such that the part above the bending portions 29 and 30 in the vehicle will be inclined toward rear part of the vehicle, i.e., in the direction opposite to external forces. The first frame 22 and the second frame 23 having the bending portions 29 and 30 are coupled at the upper ends to the coupling portions 35 and 36 of the third frame 24 extending in the width direction of the vehicle. Both ends of the third frame 24 extending in the width direction of the vehicle are provided with structures inclined toward the rear part of the vehicle. Both ends of the third frame 24 extending in the width direction of the vehicle are provided with the mounting portions 37 and 38 to be coupled to the inner structure on the lateral surfaces of the car body.

In the protecting frame structure 11, the third frame 24, the first frame 22, and the fourth frame 25 are coupled together in the coupling portion 35 on the right side of the third frame 24 while the third frame 24, the second frame 23, and the fifth frame 26 are coupled together in the coupling portion 36 on the left side of the third frame 24. Therefore, in the protecting frame structure 11, the first frame 22 and the fourth frame 25 intersect the third frame 24 adapted to transmit external forces to the side body (not shown), which is the inner structure on the lateral surfaces of the car body, at one point in the coupling portion 35. Similarly, the second frame 23 and the fifth frame 26 intersect the third frame 24 at one point in the coupling portion 36. This allows the protecting frame structure 11 to increase the rigidity of the coupling portions 35 and 36, to prevent local deformation and destruction of the third frame 24, and to transmit external forces efficiently to the car body via the third frame 24.

As shown in FIG. 2, in order to allow the rear seatback 9 described above to be folded forward for maintenance of the power supply apparatus 10, a rotation axis 8 is installed in a lower end portion of the rear seatback 9 to provide a center of rotation for the rear seat cushion 7. The rotation axis 8 of the rear seatback 9 is installed above the lower end of the rear seatback 9. Consequently, when the rear seatback 9 is folded forward, the lower end portion of the rear seatback 9 protrudes toward the protecting frame structure 11.

In this way, when the peripheral component (rear seatback 9) placed close to the protecting frame structure 11 is pivotal, and in particular, when the peripheral component protrudes toward the protecting frame structure 11, desirably, the positions of the respective bending portions 29 and 30 of the first frame 22 and the second frame 23 are set by also taking the amount of protrusion into consideration. This will allow the protecting frame structure 11 to be placed as close as possible to the peripheral component. Furthermore, for example, auxiliary equipment of the power supply apparatus 10 can be placed in a space Si between the rear seat cushion 7 and protecting frame structure 11. In so doing, desirably, the auxiliary equipment is placed out of the movement range in which the lower end portion of the rear seatback 9 is moved when the rear seatback 9 is folded forward.

Figure 3:
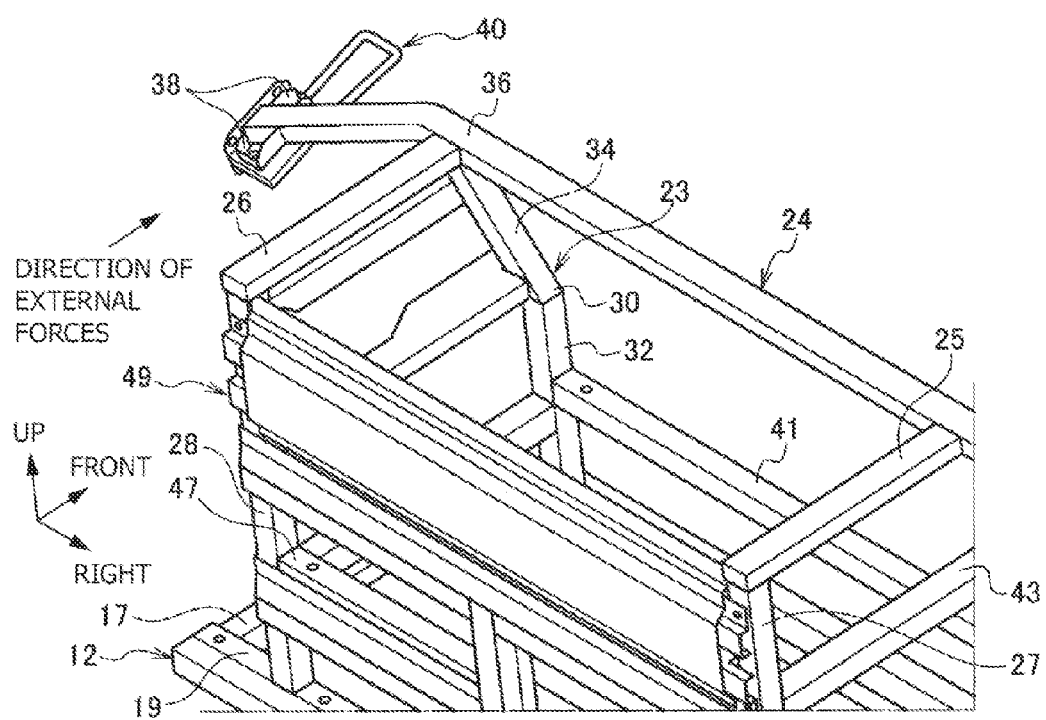
FIG. 3 is a perspective view taken in the direction of arrow III in FIG. 1. (Embodiment)
Figure 4:
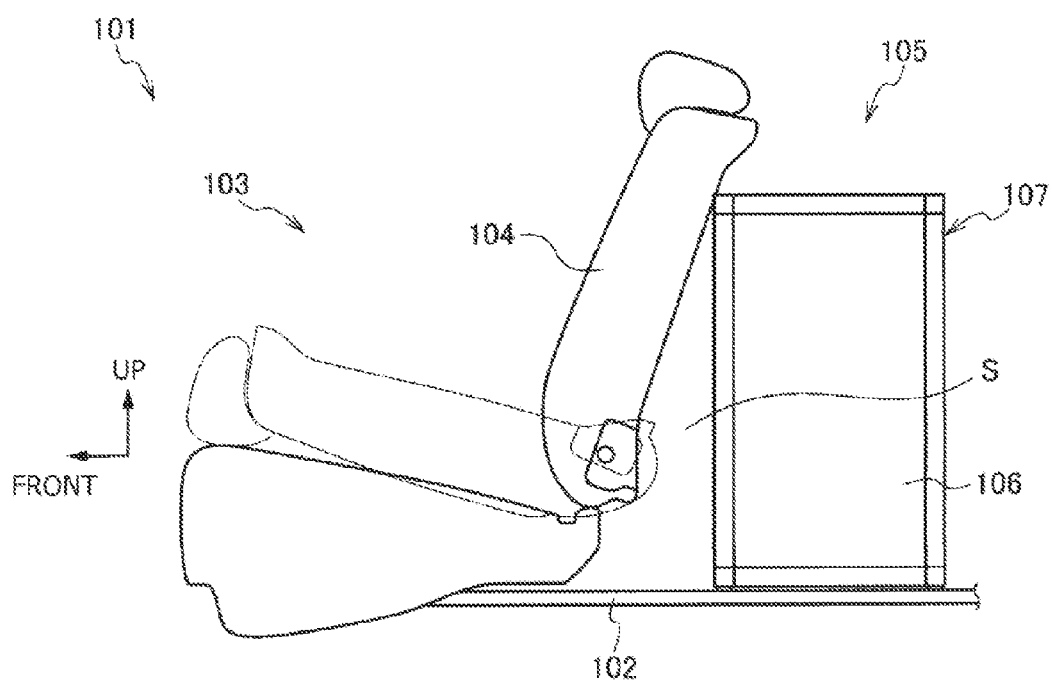
FIG. 4 is a side view showing a condition in which a protecting frame structure is mounted in a luggage compartment. (Conventional example)

The two coupling portions 35 and 36 of the third frame 24 described above are installed symmetrically to each other with respect to the center of the protecting frame structure 11 in the width direction, and thus only one of the coupling portions, i.e., the coupling portion 36, will be described. As shown in FIG. 3, it is assumed that the external forces acting on the protecting frame structure 11 is directed parallel to the front and rear direction and applied from the end side (rear end side of the fifth frame 26 or rear part of the vehicle) opposite the end on which the fifth frame 26 is connected to the coupling portion 36.

In the coupling portion 36, the third frame 24 coupled to the inner structure on the lateral surfaces of the car body while extending in the width direction of the vehicle, is coupled to the second frame 23 extending in the vertical direction and the fifth frame 26 extending in the front and rear direction. Here, the inclined portion 34 located above the bending portion 30 of the second frame 23 connected to the coupling portion 36 is structured to be inclined toward the fifth frame 26 (toward the rear end of the fifth frame 26), while the upper end is coupled to the coupling portion 36 of the third frame 24. The mounting portion 38 is located outside the coupling portion 36 in the width direction and such that the mounting portion 38 on the end of the third frame 24 also bends toward the rear end of the fifth frame 26 from the coupling portion 36.

Thus, a junction point (coupling portion 36) among the frames 23, 24, and 26 or a junction point (mounting portion 38) between the protecting frame structure 11 and car body 2, is located further rearward and further outward in the width direction while heading toward the upper end of the protecting frame structure 11, and allows the external forces exerted on the protecting frame structure 11 to be transmitted efficiently to the inner structure on the lateral surfaces of the car body.

With the above configuration, the protecting frame structure 11 for the power supply apparatus 10 has the following advantages.

The protecting frame structure 11 can be installed close to the back of the rear seat 6. Therefore, it is possible to avoid a situation in which a large space is generated between the rear seat 6 and protecting frame structure 11 and install the protecting frame structure 11 at a location away from the vehicle's rear end portion susceptible to the impact of external forces.

The third frame 24 is connected to the inner structure on the lateral surfaces of the car body. Therefore, torsion on the upper side of the protecting frame structure 11 can be reduced.

The third frame 24 is connected to the inner structure on the lateral surfaces of the car body. Therefore, the external forces exerted on the protecting frame structure 11 can be transmitted to the car body, and these structures make it possible to prevent local deformation and destruction of the car body 2 compared to when the lower end of the protecting frame structure 11 is simply fastened to the floor panel 3.

The third frame 24, which bends and extends on opposite ends in the direction (specifically, toward rear part of the vehicle) opposite the direction of external forces, acts to pull the inner structure on the lateral surfaces of the car body in the same direction (specifically, toward forward part of the vehicle) as the external forces, the inner structure being coupled to the opposite ends of the third frame 24. This makes it possible to efficiently restrict movement of the protecting frame structure 11 due to external forces.

The first frame 22, the third frame 23, the fourth frame 25, and the fifth frame 26 connected to the third frame 24 extending in the direction (specifically, toward rear part of the vehicle) opposite the direction of external forces. Furthermore, the junction points (mounting portions 37 and 38) with the frames 22, 23, 25, and 26 or with the car body 2 are located further rearward and further outward in the width direction of the vehicle with ascent to upper part of the vehicle. Therefore, the external forces exerted on the protecting frame structure 11 can be transmitted more efficiently to the car body.

The first frame 22, the third frame 24, and the fourth frame 25 are connected together in one location, i.e., the coupling portion 35 while the second frame 23, the third frame 24, and the fifth frame 26 are connected together in one location, i.e., the coupling portion 36. Therefore, it is possible to increase the rigidity of the coupling portions 35 and 36 and prevent local deformation and destruction of the protecting frame structure 11.

The protecting frame structure 11 is structured to be shorter in the front and rear direction on the upper-end side than on the lower-end side. Therefore, stability of protecting frame structure 11 in the vertical direction is increased.

The rear seatback 9 covering the protecting frame structure 11 on the front side in the direction of the vehicle can be folded forward. Therefore, maintenance of the power supply apparatus 10 can be performed from the front side in the direction of the vehicle.

In this way, the protecting frame structure 11 for the power supply apparatus 10 includes the first frame 22 and the second frame 23 installed while extending in the vertical direction of the vehicle as well as the third frame 24 installed while extending in the width direction of the vehicle. In the width direction of the vehicle, the first frame 22 and the second frame 23 include the respective bending portions 29 and 30 as well as the inclined portions 33 and 34, the bending portions 29 and 30 are located between the upper end and lower end of the rear seatback 9 which is a peripheral component, and the inclined portions 33 and 34 are located on the upper side of the vehicle above the bending portions 29 and 30 and configured to be inclined toward the rear side of the vehicle with the respective upper ends of the inclined portions 33 and 34 being coupled to the third frame 24. The third frame 24 includes coupling portions 35 and 36 for coupling to the first frame 22 and the second frame 23 as well as the mounting portions 37 and 38 provided at both ends and mounted on the side body (not shown), which is the inner structure on the lateral surfaces of the vehicle, using fastening members such as bolts.

Consequently, with the protecting frame structure 11 for the power supply apparatus 10, the protecting frame structure 11 can be installed close to the rear seatback 9 which is an adjacent peripheral component and installed in the vehicle 1 without providing a more than necessary space S between the protecting frame structure 11 and rear seatback 9. This allows the protecting frame structure 11 to be installed in the vehicle 1 with its mounting position established away from the rear end of the vehicle, and makes it possible to reduce external forces exerted on the power supply apparatus 10 in case, for example, the vehicle 1 is hit from behind by another vehicle.

The protecting frame structure 11 for the power supply apparatus 10 is not only fastened in its lower end portion to the floor panel 3, but also connected to the inner structure on the lateral surfaces of the vehicle. Therefore, the protecting frame structure 11 can be fastened to the car body 2 more securely, and the upper end portion of the protecting frame structure 11 can be fastened to the lateral surfaces of the vehicle which makes it possible to prevent the upper end portion of the protecting frame structure 11 from undergoing torsion and prevent the protecting frame structure from falling down.

Furthermore, the protecting frame structure 11 for the power supply apparatus 10 allows the external forces received by the protecting frame structure to be transmitted to the car body 2 via the third frame 24, and inhibits increases in the weight of the vehicle while eliminating the need to firmly fasten the lower end portion of the protecting frame structure 11 to the floor panel.

The protecting frame structure 11 for the power supply apparatus 10 includes the fourth frame 25 and the fifth frame 26 installed so as to extend along the floor panel 3 toward rear part of the vehicle by being coupled, respectively, to the coupling portions 35 and 36 at which the third frame 24 is coupled to the first frame 22 and second frame 23.

Consequently, the protecting frame structure 11 for the power supply apparatus 10 can concentrate external forces on the highly rigid coupling portions 35 and 36 where the plurality of frames 22 to 26 meet, and the protecting frame structure 11 makes it possible to prevent local deformation and destruction of the frames 22 to 26 and transmit the external forces exerted on the protecting frame structure 11 efficiently to the car body.

Incidentally, although the protecting frame structure 11 according to the present embodiment is applied to the power supply apparatus 10 by way of illustration, the protecting frame structure 11 is applicable not only to the power supply apparatus 10, but also to a high-voltage apparatus mounted behind the rear seatback 9. The sixth frame 27 and the seventh frame 28 may be configured to have bending portions as in the case of the first frame 22 and second frame 23 based on shape of back doors and on how the back doors are deformed by external forces from outside the vehicle.

INDUSTRIAL APPLICABILITY

The present invention is capable of reducing impact of external forces on a power supply apparatus by placing the power supply apparatus close to a peripheral component inside a vehicle and as far away as possible from ends of the vehicle, which are susceptible to the impact of the external forces from outside the vehicle and is applicable not only to the power supply apparatus, but also to protection of car parts mounted in a luggage compartment.

The invention claimed is:

1. A protecting frame structure for a power supply apparatus, the power supply apparatus mounted in a vehicle, and the protecting frame structure configured by a plurality of interconnected frames and configured to house the power supply apparatus therein, the protecting frame structure comprising:
   a floor panel configured such that a lower end portion of the protecting frame structure is mounted; and
   a peripheral component including a tilting structure extending in a vertical direction of the vehicle, the tilting structure tilting toward a position on which the protecting frame structure is installed, wherein
   the protecting frame structure includes a first frame and a second frame which extend in the vertical direction of the vehicle, and a third frame which extends in a width direction of the vehicle,
   the first frame and the second frame have bending portions and inclined portions,
   upper ends of the first frame and the second frame are coupled to the third frame,
   the first frame and the second frame are spaced apart from lateral surfaces of the vehicle, respectively;
   the inclined portions have upper parts which are located adjacent to an upper portion of the vehicle above the bending portions,
   the upper parts of the inclined portions are inclined rearward on the vehicle,
   the third frame has coupling portions which couple to the first frame and the second frame, and both ends in the width direction of the vehicle, which are respectively arranged outside of the coupling portions in the width direction of the vehicle so as to be from the coupling portion to the lateral surface of the vehicle, and
   both ends of the third frame are respectively connected to lateral surfaces of the vehicle.

2. The protecting frame structure for the power supply apparatus according to claim 1, wherein
   the bending portions are located between an upper end and a lower end of the peripheral component in the vertical direction of the vehicle.

3. The protecting frame structure for the power supply apparatus according to claim 1, further comprising a fourth frame and a fifth frame coupled, respectively, to the coupling portions of the third frame which couple to the first frame and the second frame, the fourth frame and the fifth frame extending along the floor panel toward a rear portion of the vehicle.

4. The protecting frame structure for the power supply apparatus according to claim 1, wherein the both ends of the third frame are extended so as to be inclined toward a rear portion of the vehicle.

* * * * *